United States Patent Office 3,850,872
Patented Nov. 26, 1974

3,850,872
GLASS FIBER REINFORCED ELASTOMERS
Alfred Marzocchi, Cumberland, R.I., assignor to Owens-Corning Fiberglas Corporation
No Drawing. Filed Dec. 21, 1972, Ser. No. 317,435
Int. Cl. C08g 51/10; C08f 45/10
U.S. Cl. 260—37 EP                                        13 Claims

ABSTRACT OF THE DISCLOSURE

This invention is addressed to glass fiber-reinforced elastomeric materials and a method for their manufacture wherein an oily extender material which is reactive with glass fiber anchoring agents is blended with an elastomer to uniformly distribute the extender material throughout the elastomer, and the resulting elastomer compound is combined with glass fibers which have been treated with a glass fiber anchoring agent to chemically bond the glass fibers to the elastomeric material through the extender material.

---

This invention relates to glass fiber-elastomeric products, and more particularly to the treatment of glass fibers and compositions in the treatment of glass to facilitate the combination of glass fibers with elastomeric materials such as the manufacture of glass fiber-reinforced elastomeric products.

The term "glass fibers," as used herein, is intended to refer to and include (1) continuous fibers formed by rapid attenuation of hundreds of streams of molten glass and to strands formed when such continuous glass fiber filaments are gathered together as they are being formed; and to yarns and cords formed by plying and/or twisting a number of strands together, and to woven and non-woven fabrics which are formed of such glass fiber strands, yarns or cords, and (2) discontinuous fibers formed by high pressure steam, air or other suitable attenuating force directed onto multiple streams of molten glass issuing from a glass melting bushing or from an orifice containing spinner, and to yarns that are formed when such discontinuous fibers are gathered together to form a sliver which is drafted into a yarn; and to woven and non-woven fabrics formed of such yarns of discontinuous fibers, and (3) combinations of such continuous and discontinuous fibers in strands, yarns, cords and fabrics formed thereof.

As used therein, the terms "elastomer" and "rubber" are intended to mean and include natural rubber in the cured or uncured stage, vulcanized or unvulcanized stage, and synthetic organic elastomeric materials such as nitriles, acrylics and esters and terpolymers thereof with styrene and acrylonitriles, styrene and vinyl pyridine; and synthetic rubbers as represented by butadiene polymers and copolymers with monoolefins such as butadiene-styrene vinyl pyridine terpolymers, chloroprene, isoprene, neoprene, isobutyl rubber and the like elastomeric polymers and copolymers in their cured or uncured stages, and vulcanized or unvulcanized stages. Included also are the EPDM rubbers, such as formed by the interpolymerization of ethylene, an alpha-monoolefin having from 3–20 carbon atoms, such as propylene, and polyene, such as dicyclopentadiene, 1,4-hexadiene, and preferably an alkylene or alkylidene norbornene, such as 5-alkylidene-2-norbornene and the like in which the alkylidene group numbers from 2–12 carbon atoms, and polysulfone rubbers.

It is now well known to combine glass fibers with elastomeric materials in the manufacture of glass fiber-reinforced elastomeric products, such as driving belts, timing belts, pneumatic tires, etc. One of the problems which have been encountered in such combinations of glass fibers with elastomeric products is the problem of securely anchoring the glass fiber surfaces to the elastomeric material in which the glass fibers are distributed. It is believed that this problem stems in part from the fact that the glass fibers are completely smooth, rod-like members and in part from the fact that the glass fiber surfaces are highly hydrophilic in nature, thereby resulting in the formation of a thin but tenacious film of water on the glass fiber surfaces which serves to destroy any bond, chemical or physical, which would otherwise be formed between the glass fiber surfaces and the elastomeric material with which the glass fibers are combined.

To minimize the problems of bonding the glass fiber surfaces to the elastomeric materials, it has been the practice in the manufacture of glass fiber-reinforced elastomeric products to make use of glass fibers in the form of individual glass fibers having a coating on the surfaces thereof to intertie the individual glass fibers to the elastomeric material in which the glass fibers are distributed, or preferably glass fibers in the form of yarns, cords, chopped strands or fabrics, hereinafter referred to as bundles, containing an impregnant therein which also serves to intertie the glass fiber bundles to the elastomeric material in which the bundles are distributed.

While the practice as described above represents a very important advance in the art of manufacture of glass fiber reinforced elastomeric products, the use of an impregnation step to deposit an elastomer compatible impregnant in the glass fiber system constitutes an additional step requiring additional processing equipment and thus adds to the cost of the glass fiber reinforced elastomeric products.

It is accordingly an object of the present invention to produce and to provide a method for producing glass fiber reinforced elastomeric products in which the glass fibers are securely bonded to the elastomeric material without the need to impregnate the glass fibers.

It is a more specific object of the present invention to produce and to provide a method and composition for producing glass fiber reinforced elastomeric products in which one of the bonding components is formulated with the elastomeric material constituting the continuous phase in which the glass fibers are distributed.

As is well known to those skilled in the art, rubbers, both natural and synthetic, are usually compounded to include, *inter alia*, processing or extender oils. Such oils are included in the rubber batch for the purpose of softening or "plasticizing" the rubber to increase the molecules. A number of such oils are known to the art and are frequently classified as (1) naphthenic oils, (2) aromatic oils and (3) highly aromatic oils. These oils are most frequently derived from various petroleum fractions.

As a general rule, oils of the type described above exhibit increasing compatibility with rubbers with increasing aromaticity and unsaturation. The presence of polar groups in the oils also tends to favor compatibility.

The concepts of the present invention reside in a completely new approach to the reinforcement of elastomeric materials with glass fibers in which glass fibers which have a thin size coating on the surfaces thereof containing a function organo silicon compound or a substituted Werner complex compound are combined with an elastomeric material which has been extended with an oily material such as polyepoxide or a polyester. The oily material, which is preferably a low molecular weight material, serves as an oil-extender to improve the physical characteristics of the elastomeric material and serves to intertie the glass fibers to the compounded elastomer with which the glass fibers are combined.

In the preferred practice of the present invention, the oily extender material is a low molecular weight epoxide resin. A number of such resins can be used in the practice of the invention including the epoxide prepared by reacting an epihalohydrin, such as epichlorohydrin, with a polyhydric phenol (e.g., bis-(4-hydroxyphenyl)-2,2-propane, resorcinol, hydroquinone) or a polyhydroxy alcohol (e.g., alkylene glycols containing 2 to 6 carbon atoms, polyalkylene glycols, glycerol etc.). Such epoxides are characterized by terminal epoxy groups.

For example, epoxides formed by reaction of epichlorohydrin and bisphenol A have the formula

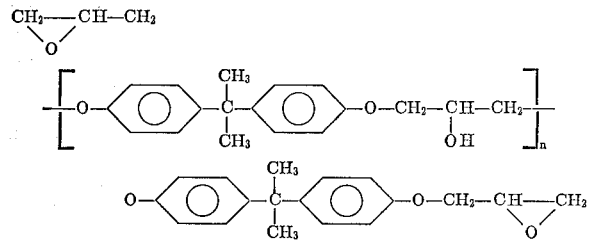

wherein $n$ is a function of the molecular weight. A number of such lower molecular weight resins are commercially available from Shell Chemical Co. under the trademark "Epon."

Epoxides formed by reaction of epichlorohydrin with alkylene glycols have the formula

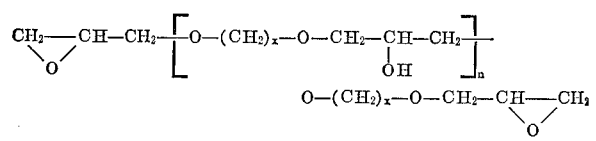

wherein $x$ is an integer from 1 to 6.

In general, it is preferred to employ liquid epoxides in the practice of the invention. Such epoxides usually have an average molecular weight less than 2000, and preferably less than 1500.

Instead of epoxide resins, use can also be made of epoxidized oils, including epoxidized mineral oils. Such oils are well known to those skilled in the art and are prepared by subjecting an unsaturated hydrocarbon oil containing 10 to 30 carbon atoms to epoxidation with, for example, hydrogen peroxide or a percarboxylic acid in a conventional manner. Also suitable are epoxidized oils, such as epoxidized triglycerides. Preferred epoxidized triglycerides are the epoxidized soy bean oils marketed by Swift and Company such as "Epoxol 7-4" which has a minimum oxirane oxygen content of 7.0 and "Epoxol 9-5" which has a minimum oxirane oxygen content of 9.0%.

The epoxides described above can be combined with an elastomer or rubber in a conventional manner. For example, the epoxides can simply be admixed with the rubber and then the resulting mixture worked on a conventional rubber processing device such as a rubber mill to physically blend the epoxide with rubber and uniformly distribute the epoxide throughout the rubber. Alternatively, the epoxide can be added to a latex of the rubber and blended therewith and then recover the rubber from the latex admixed with the epoxide. Also, either the rubber or the epoxide can be dissolved in a solvent, such as an inert organic solvent, to blend one of the rubber or epoxide with the other. It is frequently desirable to dissolve the epoxide in an organic solvent to reduce the viscosity of the epoxide, and blend the resulting solution with the rubber.

In the most preferred practice of the present invention, the epoxides as described above are blended with rubber in combination with a curing agent for the epoxides.

Such curing agents are themselves well known and are compounds which are capable of reaction with the epoxy groups and/or secondary hydroxy groups in the epoxide molecules. Representative of such well known curing agents are polyamines, such as the alkylene polyamines and polyalkylene polyamines (e.g. ethylene diamine, propylene diamine, butylene diamine, pentylene diamine, diethylenetriamine, triethylene tetramine, tetraethylenepentamine, dipropylene triamine, dibutylene triamine, tripropylene tetramine, tributylene tetramine, tetrapropylenepentamine, etc.) amine-terminated polyamides, low molecular weight urea-formaldehyde and phenol-formaldehyde resins, acid anhydrides (e.g. phthalic anhydride, maleic anhydride, etc.) and $BF_3$-$NH_3$ complexes. Preferred are the amine curing agents; as is known to those skilled in the art, nearly any poly-primary or -secondary amine is capable of use as a curing agent.

In order to prevent premature curing or reaction between the epoxides and the curing agent (when use is made of a curing agent), it is preferred to minimize contact between the epoxide and the curing agent during the blending of the epoxide and the curing agent with the rubber. The isolation is effected as to one or the other of the curing agents and the epoxide. In accordance with one embodiment of the invention, either one or both of the epoxide and the curing agent is employed in encapsulated form. Thus, the curing agent and/or epoxide is contained in a capsule of an inert material which is sensitive to elevated temperatures to release the contents of the capsule at such temperatures. Capsules of this type are well known in the art of the so-called carbonless copy paper and are frequently formed of gelatin, urea-formaldehyde resins or the like heat sensitive materials.

Thus, the capsules prevent or at least minimize contact between the epoxide and the curing agent as the epoxide and the curing agent is blended with the rubber, but release their contents during curing or vulcanization of the compounded rubber in combination with the glass fibers.

In accordance with another, and frequently preferred embodiment of the invention, at least one of the epoxide and the curing agent is first adsorbed on a porous, inert inorganic material and the inorganic material containing the epoxide and/or curing agent adsorbed in the pores thereof is blended with the rubber, preferably by milling to uniformly distribute the inorganic material through the elastomer or rubber. Thus, as the elastomer or rubber containing the inorganic material blended therewith is heated for cure and/or vulcanization while in combination with the glass fibers, the epoxide and/or curing agent migrate from the pores of the inorganic material for reaction with each other and for reaction with the treated glass fibers to bond the glass fibers to the elastomer with which the glass fibers are combined. The inorganic material remains in the glass fiber reinforced elastomeric product as a filler to impart additional strength to the elastomeric component of the glass fiber reinforced elastomeric product.

As the inorganic material, use can be made of a variety of porous, finely divided inorganic materials conventionally used as fillers for elastomers. Such materials include silica, alumina, hydrated alumina, calcium carbonate, calcium silicate, calcium sulfate, clays, carbon and the like. The epoxide and/or curing agent can be adsorbed in such inorganic materials by saturating the inorganic material with the epoxide or curing agent; the saturated inorganic material can then be used for blending with the elastomeric material. However, it will be understood by those skilled in the art that the inorganic material need not necessarily be saturated with the adsorbed epoxide or curing agent if desired. Minimum quantities of filler or inorganic material are required when the inorganic material is saturated with the epoxide or curing agent.

The amount of the oily epoxide compounded with the elastomer in accordance with the practice of the invention is not critical and can be varied within wide ranges. In general, best results are obtained when the elastomer is compounded with 1 to 60 parts by weight of epoxide per hundred parts by weight of elastomer, and preferably 10 to 50 parts by weight of epoxide per hundred parts by weight of the elastomer.

When a cross linking or curing agent is employed in combination with the epoxide, the amount of the curing agent can be varied. In general, it is preferred to employ from 0.01 to 2 moles of curing agent per mole of the epoxide although greater or smaller amounts can be utilized. Where the epoxide and/or curing agent is adsorbed in an inorganic material, it is generally preferred that the inorganic material constitute from 10 to 50% by weight of the total of the adsorbed epoxide or curing agent and the inorganic material.

The elastomer or rubber with which the epoxide or epoxide and curing agent is combined can also be formulated to include conventional additives, including vulcanizing agents, retarders, anti-oxidants, pigments, etc. The elastomer is in an uncured or unvulcanized state when compounded with the extender in accordance with the practice of the invention. It is believed that the secure bonding relationship between the glass fibers and the elastomer is created primarily as the composite is subjected to vulcanization and cure.

As indicated above, the glass fibers which are combined with the elastomer compounded in accordance with the concepts of the invention are glass fibers which have been sized or coated with a thin film of, as the essential component, a glass fiber anchoring agent in the form of an organo silicon compound or a Werner complex compound. Such anchoring agents are well known in the treatment of glass fibers.

Preferred organo silicon compounds are the organo silanes which contain 1 to 3 readily hydrolyzable groups (e.g., lower alkoxy or halogen) and at least one organic group attached directly to the silicon atoms containing 2 to 10 carbons and substituted by an amino group, a mercapto group, an epoxy group or a hydroxy group. Such silanes can be illustrated by formula

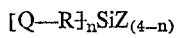

wherein Q is one of the functional groups described above, R is a divalent organic group, Z is a readily hydrolyzable group as described and n is an integer from 1 to 3.

Preferred divalent organic groups include $C_2$ to $C_6$ alkylene (e.g. dimethylene, trimethylene, tetramethylene, etc.), acrylene such as phenylene, naphthylene, etc., cycloalkylene such as cyclopentylene, cyclohexylene, etc., and alkenylene containing 2 to 6 carbon atoms (e.g. ethenylene, propenylene, etc.).

Representative of such silanes include gamma-aminopropyltrimethoxy silane, delta-aminobutyltriethoxy silane, p-aminophenyltrimethoxy silane, beta - aminovinyltrimethoxy silane, gamma - aminoallyltrimethoxy silane, gamma-mercaptopropyltrimethoxy silane, p-mercaptophenyltrimethoxy silane, gamma-hydroxypropyltriethoxy silane, 3,4-epoxycyclohexyltrimethoxy silane, 3,4-epoxycyclohexylpropyltrimethoxy silane, glycidoxypropyltrimethoxy silane as well as the corresponding silanols and polysiloxane derivatives which are formed by hydrolysis of such silanes in aqueous media.

Werner complex compounds having hydroxy, epoxy or amino carboxylato groups coordinated with the nuclear chromium atom for use in the practice of this invention may be represented by the formula

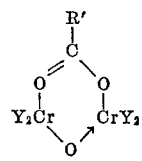

wherein Y is halogen and preferably chlorine and R' is an amino alkyl group containing 1 to 5 carbon atoms (e.g. aminomethyl, aminoethyl, aminopropyl, etc.), a hydroxyalkyl group containing 1 to 5 carbon atoms (e.g. hydroxymethyl, hydroxyethyl, hydroxypropyl, etc.), or an epoxy group

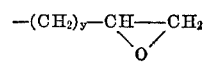

where y is an integer from 1 to 4.

The foregoing complexes can be prepared by known procedures in which a basic chromium solution is reacted with the corresponding carboxylic acid in the presence of an alkanol such as isopropanol as described in U.S. Pats. Nos. 2,544,667 and 2,683,156. Suitable acids include glycine or beta-aminoacetic acid, gamma-aminopropionic acid, delta-aminobutanoic acid for the preparation of the amino complexes, 3,4-epoxybutanoic acid and 4,5-epoxypentanoic acid for the preparation of epoxy complexes and glycolic or beta-hydroxyacetic acid, gamma-hydroxypropanoic acid and delta-hydroxybutanoic acid for the preparation of the hydroxy complexes.

Representative complexes are glycylato chromic chloride, gamma - aminopropylato chromic chloride, delta-aminobutylato chromic chloride, gamma - hydroxypropylato chromic chloride, 3,4 - epoxy - butylato chromic chloride, 4,5-epoxy-pentylato chromic chloride, etc.

The anchoring agents described above can be conveniently employed in aqueous solution for application on the glass fiber surfaces. The thin film coating on the individual glass fiber surfaces preferably constitutes from 0.01 to 3% by weight of the coated glass fibers. If desired, the coating composition can be formulated to include conventional size additives such as a film forming binder, glass fiber lubricants, wetting agents, etc., which improve the processing characteristics of the glass fibers for combination with the compounded elastomer without significantly affecting the adhesion characteristics of the coated glass fibers.

Without limiting the present invention as to theory, it is believed that the foregoing substituted silanes and Werner complex compounds are capable of reaction with the epoxides distributed through the rubber to securely anchor the glass fiber surfaces to the rubber while the epoxide serves to improve the properties of the rubber itself. It has been found that comparable results cannot be achieved by pre-reacting the epoxide with the functional silane or Werner complex compound; it is believed that the pre-reaction product in the form of a coating of the glass fibers as described by U.S. Pat. No. 3,509,012 is incapable of being distributed throughout the elastomer constituting the continuous phase.

Moreover, it is further believed that the cured epoxide or polyester is present within the elastomer or rubber in a three dimensional configuration which is chemically bonded to the glass fiber surfaces through the anchoring agents present in the coating on the glass surfaces.

Having described the basic concepts of the invention, reference is now made to the following examples, which are provided by way of illustration but not of limitation, of the practice of the present invention.

EXAMPLE 1

This example illustrates the use of an epoxide-extended rubber in accordance with the practice of the invention.

An epoxide resin formed by reaction of epichlorohydrin and butylene glycol having an average molecular weight of 933 is compounded with neoprene rubber in accordance with the following recipe:

Rubber Formulation

| | Parts by weight |
|---|---|
| Neoprene rubber | 100.0 |
| Epoxide | 15.0 |
| MgO | 3.0 |
| Sulfur | 3.0 |
| Anti-oxidant (Aminox) | 2.0 |

The rubber is compounded by blending the components in a mill for a time sufficient to provide a uniform blend. Thereafter, glass fibers which have been sized as they are formed with the following:

Size Composition

| | Parts by weight |
|---|---|
| Gamma-aminopropyltriethoxy silane | 3.0 |
| Lubricant (Nopcogen 16L) | 0.5 |
| Water | 96.5 | are combined with the rubber by laying down the glass fibers between sheets of the compounded recipe. The resulting composite is then molded at elevated temperature and pressure under conventional conditions to advance the neoprene rubber to a vulcanized state, and to securely bond the sized glass fibers to the rubber which constitutes a continuous phase.

EXAMPLE 2

This example illustrates the compounding of an epoxide and a curing agent with rubber in accordance with the practice of this invention.

A commercially available epoxide resin (Epon 834) prepared by reaction of epichlorohydrin and bis-phenol A having an average molecular weight of 470 is compounded with butadiene-styrene rubber in the following recipe:

Rubber Compound

| | Parts by weight |
|---|---|
| Butadiene-styrene rubber | 100.0 |
| Epoxide | 23.5 |
| Anti-oxidant | 1.0 |
| ZnO | 3.0 |
| Stearic acid lubricant | 2.0 |
| Carbon black | 30.0 |
| Santocure curing agent | 1.5 |
| Tetramethylene diamine adsorbed on silica | 60.0 |

All the components of the recipe are blended together until a substantially uniform blend is produced. Then the curing agent (tetramethylenediamine) adsorbed on silica is blended with the resulting mixture. The adsorbed curing agent component of the recipe is prepared by admixing excess diamine with dry silica having a surface area of about 50 m.$^2$/g., and the excess diamine is removed by decantation. The resulting product contains about 22 parts by weight of the diamine and 38 parts by weight of the silica.

The rubber compound is then milled with glass fibers which have been coated with the following composition:

Size Composition

| | Parts by weight |
|---|---|
| Glycidoxy propyltrimethoxy silane | 3.0 |
| Lubricant (Nopcogen 16L) | 0.5 |
| Water | 96.5 | and then chopped to lengths from 0.1 to 3.0 inches. The composite of the rubber compound and the chopped glass fibers is then heated under pressure to cure or vulcanize the rubber compound and to cure the epoxy resin extender by causing the diamine curing agent to migrate from the pores of the silica. It is found that the chopped glass fibers are securely bonded to the cure elastomeric material.

EXAMPLE 3

This example illustrates the addition of an epoxide and a curing agent for the epoxide to a latex of an elastomer.

A latex of butadiene-styrene rubber prepared by emulsion polymerization of 75 parts by weight butadiene and 25 parts by weight styrene is modified to provide the following composition:

Rubber Compound

| | Parts by weight |
|---|---|
| Butadiene-styrene rubber | 100.0 |
| Emulsifying agent | 5.0 |
| Water | 180.0 |
| Anti-oxidant (N-phenyl-2-naphthylamine) | 1.5 |
| Epoxide resin of Example 2 | 20.0 |
| Carbon black | 20.0 |
| Diethylenetriamine in gelatin capsules | 31.0 |

The parts by weight of the amine curing agent capsules is based on the weight of the amine.

The resulting mixture is maintained at room temperature while subjected to vigorous agitation. Thereafter, the latex is coagulated to recover the epoxy extended SBR rubber admixed with the capsules of curing agent, and the product is washed, dried and blended with conventional vulcanizing agents for SBR rubber.

The rubber compound produced is then combined with chopped glass fibers as described in Example 2 in which the glass fibers had been coated with the following composition:

Size Composition

| | Parts by wt. |
|---|---|
| Polyvinyl alcohol | 3.0 |
| Lubricant (Nopcogen 16L) | 0.2 |
| Pyrrolidone | 1.0 |
| Gamma-mercaptopropyltrimethoxy silane | 3.0 |
| Water | 91.8 | and dried. The composite of the SBR rubber is then vulcanized in a conventional manner to bond the glass fibers to the elastomeric material.

EXAMPLE 4

Using the procedure described in Example 2, the following rubber compound is prepared:

Rubber Compound

| | Parts by wt. |
|---|---|
| Butadiene-styrene rubber | 80.0 |
| Natural rubber | 20.0 |
| ZnO | 3.0 |
| Carbon black | 10.0 |
| Anti-oxidant | 2.0 |
| Sulfur | 2.0 |
| Tetramethylthiuram monosulfide | 2.0 |
| Mercaptobenzothiazole | 0.5 |
| Epoxide of Example 1 | 15.0 |
| Hexamethylenediamine adsorbed on alumina | 25.0 |

The rubber compound is then combined with glass fibers which have been sized with the following composition:

Size Composition

| | Parts by wt. |
|---|---|
| Gamma-aminopropylato chromic chloride | 3.0 |
| Lubricant | 0.5 |
| Water | 96.5 |

The rubber compound in combination with the glass fibers containing the coating formed of gamma-aminopropylatochromic chloride is then vulcanized to cure the epoxide and to bond the glass fibers to the rubber.

In accordance with another concept of the invention, the elastomer can be blended with an uncured, unsaturated polyester resin whereby the liquid resin tends to extend the elastomer yet provide improved bonding with glass fibers in the manufacture of glass fiber-reinforced elastomeric products.

Preferred polyester resins which can be used in the practice of this invention are liquid, unsaturated polyesters. These resins are generally prepared by reaction of a polyhydric alcohol (e.g., alkylene glycols and polyalkylene glycols) and an ethylenically unsaturated dicarboxylic acid, such as maleic acid or anhydride or fumaric acid. Preferred resins are those having an average molecular weight less than 2000, preferably less than 1500.

The polyester resins used in the practice of the invention can be cured with a number of well-known curing agents in the form of ethylenically unsaturated monomers. Representative of such curing agents include styrene, dialkyl phthalate, vinyl toluene, methyl methacrylate, triallylcyanamate, etc. The curing system for such polyesters usually includes an initiator such as a peroxide or hydroperoxide catalyst (e.g., methyl ethyl ketone peroxide, t-butyl peroxide, peracetic acid, etc.) or an activator or accelerator such as cobalt naphthenate, alkyl mercaptans and dialkyl aromatic amines. The effect of such initiator is to lower the temperature at which the cure is carried out. Since the cure of the polyester in accordance with the practice of the present invention is preferably effected simultaneously with vulcanization of the elastomer, the use of an initiator is not essential to effect the cure of the polyester resin.

It is generally preferred to isolate the curing system from the polyester when both are blended with the elastomeric material to prevent pre-reaction of the polyester with the cross-linking or curing agent. It is generally preferred to encapsulate the cross-linking or curing agent or adsorb it on a porous inert material as described above. When an initiator, such as a peroxide catalyst is also employed, it is generally desirable to isolate the catalyst from the curing agent to prevent homopolymerization of the curing agent.

This concept of the invention is illustrated by the following examples.

EXAMPLE 5

This example illustrates the use of a polyester resin as an extender for rubber without a curing agent.

Using the procedure described in Example 1, the following rubber compound is prepared:

Rubber Compound

| | Parts by wt. |
|---|---|
| Butyl rubber | 100.0 |
| ZnO | 3.0 |
| Carbon black | 50.0 |
| Tetramethylthiuram disulfide | 1.0 |
| Stearic acid | 2.0 |
| 2-mercaptobenzothiazole | 1.0 |
| Sulfur | 1.0 |
| Polyester resin | 15.0 |

The polyester resin used in this example is an oily liquid prepared by reaction of propylene glycol with maleic anhydride and has an average molecular weight of 720.

The blended rubber compound is then admixed with chopped glass fibers which have been coated with the following Size Composition

| | Parts by wt. |
|---|---|
| Gamma-hydroxypropyltriethoxy silane | 1.5 |
| Lubricant | 0.5 |
| Water | 98.0 |

The resulting composite is then vulcanized to securely bond the glass fibers to the rubber as described in Example 2.

EXAMPLE 6

This example illustrates the use of a polyester extender resin with a curing agent for compounding with an elastomer.

Using the procedure described in Example 2, a rubber compound is prepared according to the following recipe:

Rubber Compound

| | Parts by wt. |
|---|---|
| Chlorobutyl rubber | 100.0 |
| ZnO | 3.0 |
| Carbon black | 35.0 |
| Stearic acid | 1.0 |
| Benzothiazyl disulfide | 2.0 |
| Tetramethylthiuram disulfide | 2.0 |
| Anti-oxidant | 1.0 |
| Polyester of Example 5 | 20.0 |
| Styrene | 40.0 |
| T-butyl hydroperoxide adsorbed on silica | 10.0 |

After a uniform blend of the foregoing materials has been obtained, the rubber compound is blended with chopped glass fibers treated with delta-hydroxybutylato chromic chloride as described in Example 4 to form a coating of the Werner complex on the surfaces thereof. The resulting composite is then vulcanized to cure the elastomer and to cure the polyester resin as the styrene cross-linking agent is caused to migrate from the pores of the silica under the influence of heat and securely bond the glass fibers to the elastomeric material.

EXAMPLE 7

This example illustrates the use of an initiator in combination with a polyester and a curing agent.

Using the procedure described in Example 2, a rubber is compounded in accordance with the following:

Rubber Compound

| | Parts by wt. |
|---|---|
| Butadiene-styrene rubber | 90.0 |
| Natural rubber | 10.0 |
| Carbon black | 25.0 |
| Stearic acid | 2.0 |
| Sulfur | 1.0 |
| Anti-oxidant | 0.5 |
| 2-mercaptobenzothiazole | 1.5 |
| Polyester resin of Example 5 | 20.0 |
| Dialkyl phthalate adsorbed on activated alumina (25% by weight curing agent) | 42.0 |
| Benzoyl peroxide in dimethyl phthalate adsorbed on activated alumina (29% by weight peroxide) | 2.43 |

The rubber compound is then combined with chopped glass fibers in which the anchoring agent is gamma-mercaptopropyl-triethoxy silane, and the resulting composite is vulcanized under conventional conditions to cross-link the polyester resin distributed throughout the elastomer. The mercapto group of the anchoring agent in this example is not only reactive with the polyester on cure, but also serves to aid in the initiation of the polyester cure reaction.

The amounts of polyester and curing agent employed in the practice of this concept of the invention are the same as those employed for the epoxides and their respective curing agents as described above. The amount of the initiator, when used, is not critical and can be varied within wide limits. Best results are usually obtained when the catalyst or initiator is used in an amount within the range of 0.01 to 10 parts by weight per part of the cross-linking agent.

EXAMPLE 8

This example illustrates the use of a polyester and an encapsulated cross-linking agent in accordance with the practice of the invention.

Using the procedure described in Example 3, a latex of a butadiene-styrene rubber is formulated as follows:

Rubber Compound

| | Parts by wt. |
|---|---|
| Butadiene-styrene rubber | 100.0 |
| Emulsifying agent | 5.0 |
| Water | 180.0 |
| Anti-oxidant | 1.5 |
| Polyester resin | 24.0 |
| Carbon black | 45.0 |
| Styrene in gelatin capsule | 8.5 |

The polyester used in this example is a polyester prepared by reaction of maleic anhydride and dipropylene glycol and has an average molecular weight of 938.

The latex is coagulated and the SBR rubber is blended with conventional sulfur vulcanizing agents. The rubber is then combined with coated glass fibers in which the anchoring agent is delta-aminobutyltriethoxy silane, and the resulting composite subjected to vulcanization.

While not equivalent to the practice described above, a portion of the polyepoxide or polyester as described above can be coated on the glass fibers and then subsequently the coated glass fibers milled and/or calendared with rubber containing an epoxide or polyester as an extender therein, preferably in the presence of a catalyst to promote reaction between the epoxide on the glass fibers and the epoxide dispersed throughout the rubber to securely bond the glass fibers to rubber matrix constituting the continuous phase.

In the preferred practice of this embodiment, the glass fibers are preferably impregnated while in the form of a beam of glass fibers which can be impregnated by immersion into a bath of the epoxide, preferably in combination with a glass fiber anchoring agent. Thereafter, the beam of glass fibers is immediately calendared with rubber.

This embodiment can be illustrated by reference to the following example:

EXAMPLE 9

A beam of glass fibers is impregnated by immersion of the beam into a treating bath having the following composition

| | Parts by weight |
|---|---|
| Epoxided soy bean oil (Epoxol 7-4-Swift and Co.) | 20 |
| Gamma-aminopropyltriethoxysilane | 1.0 |

The beam is then immediately admixed with the rubber compound described in Example 2 and the resulting composite calendared for a period of about 5 hours at a temperature of 150° F. to cause the soy bean oil to react with the epoxide in the rubber and securely bond the glass fibers to the rubber matrix. The resulting composite can then be processed in a conventional manner by molding under heat and pressure to form a glass fiber reinforced elastomeric product.

It has been surprisingly found that adhesion between the treated glass fibers and the rubber matrix as described above can be achieved even where the rubber compound contains no epoxide. Without limiting this aspect of the invention to theory, it is believed that the epoxide groups react with acid functions in the rubber during the calendaring operation to initiate a chain of free radical reactions to bond the treated glass fibers to the rubber matrix.

It will be understood that I have provided a new and improved method for improving the bonding relationship between glass fibers and elastomeric materials wherein the elastomeric material with which the glass fibers are combined is modified to promote the bonding relationship. The practice of this invention in the use of a cured epoxide or polyester resin is particularly advantageous in that the cured extender system is believed to form a three dimensional chain in the elastomeric material which is chemically bonded to the glass fiber surfaces through the glass fiber anchoring agents.

It will be apparent that various changes and modifications can be made in the details of procedure, formulation and use without departing from the spirit of the invention, especially as defined by the following claims.

I claim:

1. A method for the manufacture of glass fiber-reinforced elastomeric products in which an elastomer constitutes a continuous phase in which the glass fibers are distributed, comprising the steps of blending an oily material in the form of an epoxide with an elastomer containing a vulcanizing agent to form a substantially uniform blend thereof, combining the blend with glass fibers having a thin coating on the surfaces thereof, said coating comprising a glass fiber anchoring agent selected from the group consisting of an organo silane having the formula $$[Q-R-]_n SiZ_{(4-n)}$$

wherein Q is a functional group selected from the group consisting of an amino group, a mercapto group, an epoxy group and a hydroxy group, R is a divalent organic radical, Z is a readily hydrolyzable group and n is an integer from 1 to 3, the corresponding silanols and polysiloxanes thereof, and a Werner complex compound having the formula

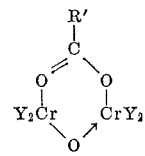

wherein Y is halogen and R' is a functional group selected from the group consisting of amino alkyl, hydroxy alkyl and an epoxy group, and heating the resulting composite of glass fibers and the blend to vulcanize the elastomer whereby the epoxide reacts with the functional group to securely bond the glass fibers to the elastomer.

2. The method as defined in claim 1 wherein the anchoring agent is an organo silane or the corresponding silanols or polysiloxanes.

3. A method as defined in claim 1 wherein the oily material is selected from the group consisting of an epoxide resin and an epoxidized hydrocarbon oil containing 10 to 30 carbon atoms.

4. A method as defined in claim 1 wherein the oily material is a polyepoxide prepared by reaction of an epihalohydrin with a compound selected from the group consisting of a polyhydric phenol and an alkylene glycol.

5. A method as defined in claim 1 which includes the step of blending a curing agent for the oily material with the elastomer prior to vulcanizing the composite.

6. A method as defined in claim 1 wherein at least one of the oily material and the curing agent is blended with the elastomer in the form of capsules of heat sensitive material containing one of the oily material and the curing agent whereby the capsules release their contents during vulcanization of the composite.

7. A method as defined in claim 1 wherein at least one of the oily material and the curing agent is blended with the elastomer while adsorbed on a porous, inert inorganic filler whereby the one of the oily material and the curing agent is caused to migrate from the pores of the porous material during vulcanization of the composite.

8. A method as defined in claim 1 wherein the curing agent is selected from the group consisting of poly-primary amines, poly-secondary amines, amine-terminated polyamides, low molecular weight urea and phenol formaldehyde resins and acid anhydride.

9. A method as defined in claim 1 wherein the glass fibers have been chopped to short lengths.

10. A method as defined in claim 1 wherein the glass fibers constitute from 1 to 30% by weight of the composite.

11. A method as defined in claim 1 wherein the oily material constitutes from 1 to 60 parts by weight per 100 parts by weight of elastomer.

12. A method as defined in claim 1 which includes the step of impregnating the glass fibers with an epoxide prior to combining the glass fibers with the elastomeric material.

13. A method as defined in claim 12 wherein the glass fibers are in the form of a beam.

References Cited
UNITED STATES PATENTS

| | | | |
|---|---|---|---|
| 3,316,195 | 4/1967 | Grosner et al. | 260—836 |
| 3,510,443 | 5/1970 | Vandenberg et al. | 260—37 EP |
| 3,510,444 | 5/1970 | Vandenberg et al. | 260—37 EP |
| 3,505,428 | 4/1970 | Kidwell et al. | 260—837 R |

OTHER REFERENCES

Handbook of Epoxy Resins, Lee et al., pp. 14–49, 1967.

MORRIS LIEBMAN, Primary Examiner

S. L. FOX, Assistant Examiner

U.S. Cl. X.R.

260—42.18, 42.44, 40